United States Patent

[11] 3,617,930

[72] Inventors Elias Snitzer
 Wellesley;
 Frank W. Hoffman, Sturbridge; Normand
 A. Guertin, Southbridge, all of Mass.
[21] Appl. No. 814,505
[22] Filed Mar. 24, 1969
[45] Patented Nov. 2, 1971
[73] Assignee American Optical Corporation
 Southbridge, Mass.
 Continuation-in-part of application Ser. No.
 333,012, Dec. 12, 1963, now abandoned.

[54] LASER STRUCTURE HAVING A CONTROLLABLE
 FREQUENCY SPECTRUM OF STIMULATED
 EMISSIVE ENERGY
 9 Claims, 6 Drawing Figs.
[52] U.S. Cl. .................................................. 331/94.5
[51] Int. Cl. .................................................. H01s 3/05
[50] Field of Search ...................................... 350/178,
 188, 320; 331/94.5

[56] References Cited
 UNITED STATES PATENTS
3,358,243 12/1967 Collins, Jr. et al. ............ 331/94.5

OTHER REFERENCES
 Collins et al. " Interferometric Mode Selector" Lasers and
Applications, Ohio State University, Nov. 1962 pp. 96– 108.
TK 7872 L359 1962

Primary Examiner—Ronald L. Wibert
Assistant Examiner—Edward S. Baner
Attorneys—William C. Nealon, Noble S. Williams and Robert
 J. Bird ABSTRACT: An elongated laser element is provided with a light energy reflective termination at one end and its opposite end is optically ground and polished normal to the axis of the element to provide a Fresnel-reflective termination at such other end. The laser is adapted to emit stimulated emissive radiation exiting as a beam through its Fresnel-reflective end, and a laser-light transmissive member is supported axially of the element in the path of the emitted beam of light energy. This member has at least one pair of at least partially reflective surfaces which receive laser-light energy from the laser element and reflectively return laser-light energy The path or paths traversed through this member by laser light reflected by one or more reflective surfaces of the member has or have a length equal to an odd integral number of quarter wavelengths at the wavelength of at least one preselected laser-light energy returned by the transmissive member to the laser element substantially augments the stimulated emission by the element of laser-light energy at the wavelength of each such preselected frequency component.

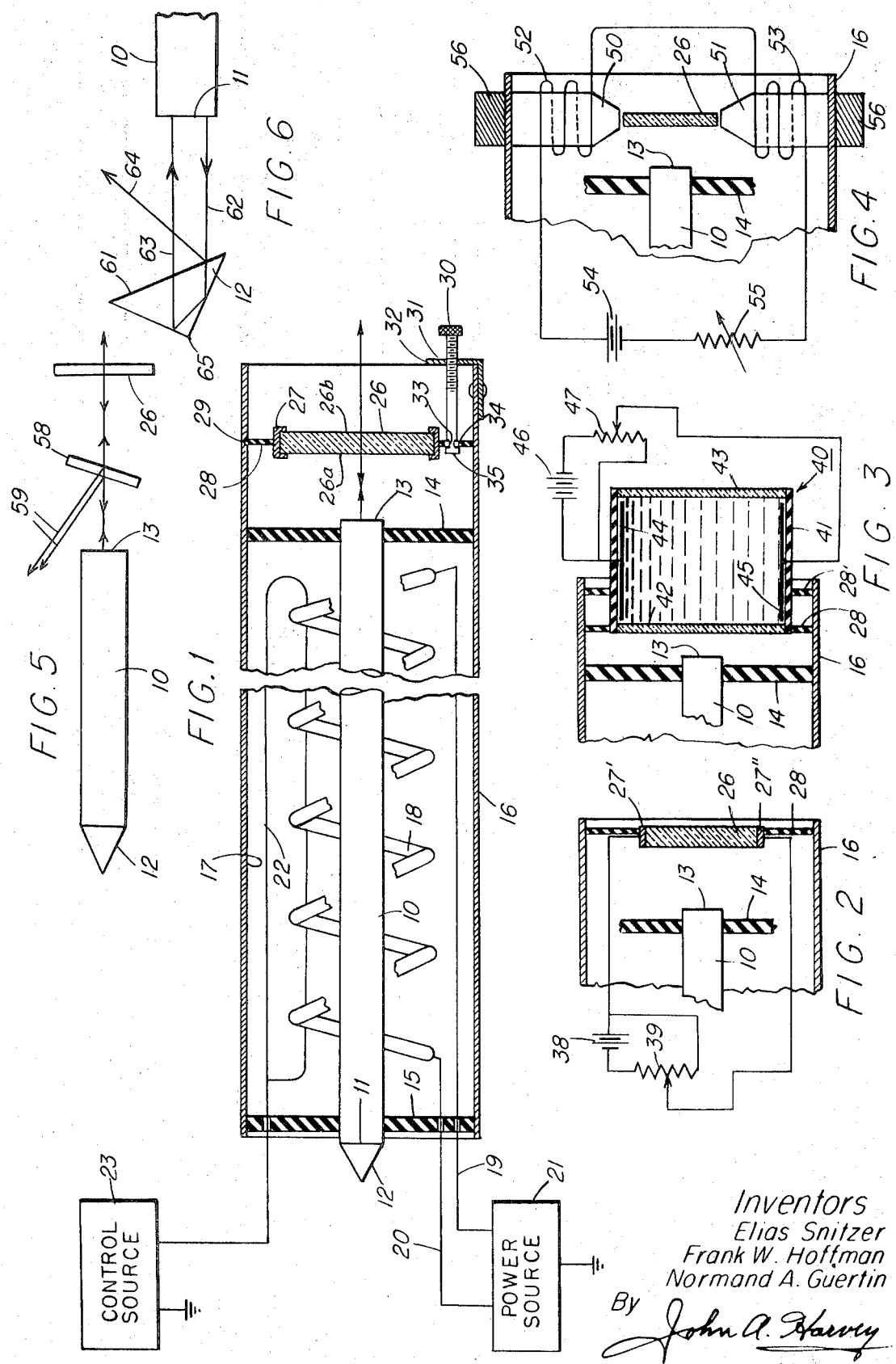

LASER STRUCTURE HAVING A CONTROLLABLE FREQUENCY SPECTRUM OF STIMULATED EMISSIVE ENERGY

The present invention relates to laser structures for generating intense beams of monochromatic light energy, and is a continuation-in-part of copending application Ser. No. 333,012 filed Dec. 12, 1963 and now abandoned.

There are a number of materials having such atomic structures that certain of their atomic systems may absorb photons of light energy of appropriate frequency and be thereby elevated from a ground-state energy level to a higher energy level. The atomic systems usually experience an immediate fast nonradiative transition from this higher energy level to a lower energy level at which the atomic systems remain with transition stability for a short interval. When the number of atomic systems at the relatively stable higher energy level exceeds the number at the ground energy level, a condition known as an inversion of energy population states, transitions by the atomic systems from the relatively stable energy level to some lower energy level takes place and light energy of a characteristic narrow band of frequencies is emitted. Such transitions may be by spontaneous action or the transitions may be stimulated by passage through the laser material of light energy of the characteristic band of frequencies. Stimulated light emission is greatly augmented by placing the laser element between reflective surfaces terminating the ends of a propagation path extending through the element, or by using a relatively elongated laser element and by placing at least partially reflective surfaces at its ends, for the purpose of reflecting emitted light back and forth through the laser material to enable these multiple reflections of light to attain even greater stimulation of light emission. This form of structure is said to have resonance characteristics and is commonly called a Fabry-Perrot interferometer type of structure. The ratio of energy storage to energy dissipation per light cycle is proportionately related to what is known as the Q of the structure. Coherent emission of light energy by stimulation increases with increase in the value of Q of the resonant structure.

The light energy employed in raising the energy level of atomic systems of a laserable material is conventionally provided by a so-called pumping light source of which a gaseous discharge flashtube is illustrative. This type of source is energized and controlled to emit successive pulses of high intensity light energy, each pulse having a duration of the order of a millisecond. Laser emitted light energy generated during each such pumping light pulse is normally observed to have a spectral composition which either consists of many sharp lines or of bands. The wavelength interval over which these lines or bands occur is a function of the intensity of the pumping light. For pumping light intensity just in excess of that required for generation of an output pulse of laser light, the wavelength interval is usually of the order of only a few angstroms whereas the wavelength interval may be as large as 100 angstroms for much higher intensity values of the pumping light.

It is an object of the present invention to provide a novel laser structure wherein the frequency spectrum of the laser emitted light may be selectively controlled and rendered relatively independent of the pumping intensity.

It is an additional object of the invention to provide an improved laser structure capable of providing laser emitted light energy having a frequency spectrum consisting of a series of equally spaced sharp lines.

It is an additional object of the invention to provide a resonant form of laser structure which is adapted to emit laser light having one or a series of equally spaced sharp lines and which, by effectively turning the structure, may not only center these lines upon particular frequencies within an overall spontaneous-emission frequency spectrum characteristic of the laser element employed in the structure but additionally may readily shift the frequency positions of these lines at will or in response to a condition (such as temperature or strain or motion) which it is desired to indicate.

Other objects and advantages of the invention will appear as a detailed description thereof proceeds in the light of the drawing forming a part of this application and in which:

FIG. 1 is an elevational cross-sectional view illustrating schematically a laser structure embodying the present invention in a particular form; and FIGS. 2-6 illustrate portions of laser structures embodying the present invention in several modified forms.

Referring now more particularly to FIG. 1, the laser structure there illustrated includes an elongated laser element 10 which may be fabricated of any conventional material such as ruby or trivalent neodymium dissolved in a barium crown glass. The latter type of material, as well as a number of other suitable materials employing fluorescent elements dissolved in inorganic and organic glasses, is disclosed in the Snitzer application Ser. No. 168,012, filed Jan. 16, 1962, and assigned to the same assignee as the present application. The laser element 10 is conveniently fabricated of circular cross section and may have a diameter of the order of 0.25 inch with a length of the order of 15 to 18 inches. One end surface 11 of the laser element 10 is ground and polished normal or essentially normal to the axis of the element and a roof prism 12 is cemented or otherwise affixed to the end surface 11 to provide a substantially completely reflective light-energy propagation-path termination at this end of the element. The opposite end 13 of the laser element 10 is likewise ground and polished to provide an end surface essentially normal to the axis of the element. This end surface (being exposed to air) exhibits a Fresnel partially reflective light-energy propagation-path termination having, for a neodymium-glass laser element, approximately 4 percent reflectivity but may be provided with a nonreflective surface coating to reduce or even minimize such reflectivity.

The laser element 10 is conveniently positioned by supporting discs 14 and 15 coaxially within a cylindrical metallic housing 16 having a highly reflective interior surface 17 to concentrate on the laser element 10 pumping light energy conventionally provided by a gaseous discharge tube 18 of helical configuration and supported concentrically of the laser element 10 by conventional structure, not shown. The gaseous discharge tube 18 has conventional terminal electrodes which are energized through a pair of conductors 19 and 20 from a power source 21. The latter conventionally is comprised by energy-storage condensers, of several thousand microfarads total capacitance, and a source of unidirectional voltage for changing the condensers to a high voltage of the order of 3,000 to 5,000 volts. A discharge control electrode 22 is connected to a control source 23 to initiate discharge of the energy stored in the condensers of the power source 21 through the gaseous discharge tube 18.

The pumping light energy created by discharge of the energy stored in the condensers of the power source 21 through the gaseous discharge tube 18 has a duration usually of the order of 1 millisecond. During this interval, photons of pumping light energy are absorbed by the atomic systems of the laser element 10 to create an inversion of energy states of the atomic systems. Atomic systems thus raised to a relatively stable high energy level subsequently experience a spontaneous transition to a lower energy level with concurrent emission of laser light energy. Assuming for the moment that the laser element end surface 13 is not provided with an antireflective surface coating, a portion of such emissive energy is bidirectionally reflected between the roof prism 12 and the partially reflective laser end surface 13 and initiates stimulated emission of light energy by other high energy level atomic systems. The stimulated emission thus initiated by the Fresnel reflective properties of the polished end surface 13, having under the assumed absence of an antireflective coating the earlier mentioned reflectivity of the order of 4 percent, causes further stimulation of light emission by high energy level atomic systems and a pulse of laser emissive light of rapidly increasing intensity is thereupon created as soon as the inversion of energy population states exceeds a threshold value. The threshold level is lowered with increasing values of Q of the resonant structure provided by the light energy propagation path extending through the laser element 10 and having reflective end terminations provided by the roof prism 12 and the Fresnel reflective surface 13. The value of Q under the assumed absence of a nonreflective coating on the surface 13 is principally established by the coefficient of reflectivity of the reflective surface 13. Also the spectral composition of this initial stimulated emission may consist of many sharp lines of unequal frequency spacings and may occupy substantial overall band width according to the intensity of the pumping light.

The laser structure also includes a thin plate 26 of transparent material, such as an inorganic or organic glass or mica, supported normal to the axis of the laser element 10 and spaced therefrom. A convenient support for the plate 26 may be metallic frame 27 secured to a generally circular disc 28. The latter has a diameter providing a sliding fit with the interior wall surface 17 of the housing 16, but is provided with a short tablike extension of its upper peripheral edge which seats within a short cooperating annular slot 29 formed in the interior wall surface of the housing 16 as shown. The disc 28 is then restrained against pivotal motion about an axis lying in the plane of cross section of FIG. 1, but may be tilted through a small angle by movement about its engagement with the slot 29. The extend of this tilting movement, provided for a purpose to be explained, is controlled by manual rotation of a thumbscrew 30 which engages a threaded aperture 31 in an upturned bracket 32 secured to the end of the housing 16 and which has a reduced end portion 33 rotatably received within an elliptical aperture 34 of the disc 28 and secured to the latter by a headed end portion 35.

The emitted light energy initially stimulated as previously described, propagates axially from the laser element 10 to the plate 26. A portion of this laser light propagates through and beyond the plate 26 as output laser light, but a portion of the laser light is reflected by Fresnel reflections from both exposed surfaces 26a and 26b of the plate 26. At laser light wavelengths corresponding to a plate thickness of an odd number of one-quarter wavelength, the plate 26 provides a reflectivity of $4r/(1+r)^2$ where $r$ is the reflectivity at the plate-air interface which for an uncoated glass plate is of the order or 4 percent. Thus the plate 26 at these laser light wavelengths reflects approximately 15 percent of the light energy transmitted to it (see "Electro Magnetic Theory" by J. A. Stratton, pages 511-514, 1st Ed., published by McGraw-Hill Book Co., New York, N.Y.). This approximately 15 percent reflectivity is added to any reflectivity of the polished end surface 13 of the laser element 10 if the plate 26 is spaced an odd number of quarter wavelengths from the surface 13 to reinforce the reflected energy of such surfaces, and causes the resonant structure including the plate 26 to have a significantly higher value of Q at each wavelength which corresponds to a thickness of the plate 26 equal to an odd number of one-quarter wavelengths.

The major stimulation of laser light emission, accordingly, occurs only at wavelengths corresponding to a plate thickness of an odd number of one-quarter wavelengths. This results in output pulses of laser light energy having a spectrum consisting of a series of sharp lines with equal frequency spacings. The wavelength spacing of the spectral lines is expressed by the relation $\Delta\lambda = \lambda^2/2nD$ (1) where $\lambda$ is the mean wavelength of the laser light, which for the neodymium-glass laser element previously mentioned is approximately 1.06 microns, n is the index of refraction of the plate 26, and D is the plate thickness. By way of example, a glass plate of 1.8 millimeters thickness was found to cause laser light energy emitted by a neodymium-glass laser element to consist of a series of sharp lines separated by 1.9 angstroms. A glass plate of 0.14 millimeter thickness restricted laser light energy from a neodymium-glass laser element to only three emissive lines separated by 25 angstroms.

In the improved arrangement of the present invention wherein the laser element 10 is relatively long in comparison to the thickness dimension of the frequency selective plate 26 aligned therewith (such as a ratio of as much as 200 to 1, more or less), nevertheless, it should also be appreciated that the light traversal path within plate 26 between the reflective surfaces 26a and 26b thereof is relatively large in comparison to the mean wavelength of the laser light at emission wavelength travelling therein and being reflected back into the laser element 10. Also, as stated above, this plate 26 for frequency spectrum control at major stimulation will have a thickness equal to an odd number of quarter wavelengths.

It will accordingly be apparent that the invention enables control to be exercised over the frequency component generation and component spacing of laser output light energy by selection of or control over the index of refraction of the material of the plate 26, or equivalent structures hereinafter described, and by selection of the thickness of the plate or by control over its effective axial thickness. Control of the effective axial thickness of the plate 26 is accomplished in the FIG. 1 structure by manual rotation of the thumbscrew 30 to tilt the plate 26 about the engagement of its supporting disc 28 with the slot 29 of the housing 16. This provides, by effective manual tuning control over the resonant characteristics of the laser resonant structure earlier described, adjustment of the laser light line positionings and frequency spacing within the spontaneous emission frequency spectrum of the laser element employed. Such adjustments are independent of the intensity of the pumping light energy.

The index of refraction or effective axial thickness of the plate 26 may be selected and controlled electrically as in FIG. 2, which illustrates a portion only of a laser structure like that of FIG. 1 except for certain differences now to be considered. In this modification the transparent plate 26 is formed of a crystalline material exhibiting a Pockels effect, or of a material exhibiting piezoelectrical characteristics such as quartz or potassium dihydrogen phosphate, and is supported in metallic frame segments 27' and 27". These in turn are supported by the disc 28, of insulating material, within the housing 16 either in a preselected fixed position or tiltable as in FIG. 1. An electrical potential is applied to the frame segments 27' and 27" from a source 38 of unidirectional potential through a potentiometer 39. The latter provides an adjustable control over the magnitude of the potential applied to the segments 27' and 27", and thus enables adjustment of the value of the effective index of refraction or effective axial thickness of the plate 26 depending upon the material of which it is formed. It will be apparent from Equation (1) that such control over the optical properties of the plate 26 enables electrical tuning of the laser resonant cavity structure and consequent adjustment of the laser light frequency-component line positionings and spacing within the laser light frequency spectrum.

FIG. 3 illustrates a portion of a laser structure like that of FIG. 1 except that control over the laser light emissive lines is accomplished electrically by a Kerr cell 40 which replaces the plate 26 of the FIG. 1 structure. The Kerr cell is positioned axially of the laser element 10 and includes a housing 41 which confines a Kerr liquid between transparent end walls 42 and 43. The conventional electrodes 44 and 45 of the Kerr cell are energized by a unidirectional potential supplied by a source 46 through a potentiometer 47 which, as in FIG. 2, enables control over the magnitude of the potential applied to the electrodes 44 and 45. The Kerr cell 40 is fixedly positioned within the end of the housing 16 by suitable discs 28 and 28'. As with the plate 26 of FIG. 1, laser energy transmitted from the laser element 10 to the Kerr cell 40 is partially transmitted through and beyond the Kerr cell and is partially reflected by each glass-air interface and each glass-liquid interface of the cell. The effective dielectric constant of the Kerr cell, as controlled by the potential applied to the electrodes 44 and 45, controls in conformity with Equation (1) the emission line spacing and relative positions within the spectrum of the output laser light as in the structures heretofore described.

A further modified form of the invention is illustrated in FIG. 4 which shows a portion of a structure of the FIG. 1 type except that the plate 26 is constructed of a transparent material which exhibits a Faraday effect. The plate 26 is suitably supported between a pair of magnetic pole structures 50 and 51 fixedly positioned within the end of the housing 16 and provided with serially connected windings 52 and 53 which are energized from a unidirectional current source 54 through an adjustable resistor 55. A path of low magnetic reluctance between the pole structures 50 and 51 is completed through a closed ring 56 of magnetic material positioned on the exterior surface of the housing 16 as shown. The windings 52 and 53 are energized with aiding magnetic field polarities and produce a magnetic field through the plate 26 which exhibits an effective index of refraction varying with the strength of the magnetic field. The resultant effective electrical tuning of the laser resonant cavity structure accordingly enables selection and control of the emission line relative positions and spacing, according to Equation (1), in the frequency spectrum of the laser light emissive energy.

The modified form of the invention illustrated schematically in FIG. 5 is similar to the arrangement of FIG. 1, similar elements being identified by similar reference numerals, except that the FIG. 5 structure includes an additional plate or disc 58 oriented at an angle to the longitudinal axis of the laser element 10. The plate 58 is fabricated of glass or a similar glasslike inorganic or organic material, and has such thickness and angle of axial tilt that its glass-air interfaces are highly reflective to selected emission lines within the overall spontaneous-emission frequency spectrum of the laser emitted light but is essentially transparent to other emission lines. The angle of axial tilt of the plate 58 is further selected such that the reflected laser-light energy is directed away from the laser element 10, as indicated by the arrows 59, so that the resonant structure has low Q and minimized stimulation of laser light emission at the wavelengths of this reflected energy. However, the laser-light energy for which the plate 58 is essentially transparent propagates through the latter to the plate 26 which has a thickness corresponding to an odd number of quarter wavelengths for one or more selected emission lines as explained in connection with FIG. 1 and accordingly provides high resonant structure Q effecting major stimulation of laser light emission at the wavelength of each such selected line. The combined effect of the plates 26 and 58 thus enables the attainment of a higher order of selectivity for a desired emission line or lines as against undesired emission lines.

FIG. 6 illustrates a portion of a laser structure in which selection of desired emission lines may be accomplished in yet another manner. This structure may be used in lieu of any of the structures heretofore described, or may be combined with one or more such structures to facilitate attainment of desired emission line selectivity. In the present structure, the prism 12 is displaced a short distance from the end surface 11 of the laser element 10 and is supported by any convenient structure, not shown, with the plane of its base surface 61 tilted at a small angle to the plane of the laser end surface 11. Notwithstanding this prism shown somewhat exaggerated in FIG. 6 for clarity an axially propagating ray of light 62 from the laser element 10 will be reflected by the prism to return as an axially propagated ray of light 63 to the laser element. It can be shown that a ray of light while traversing the prism will have traversed a path length equal to twice the height of the prism apex from its base. For those emission lines having an even number of quarter wavelengths in the traversed path, the prism appears entirely transparent and there is no reflection of light energy entering the prism. However, light energy of other wavelengths is reflected at the prism surface as indicated by the light ray 64 and the resonant structure Q is, accordingly, significantly lower for these wavelengths than for those at which reflection does not occur. The present laser structure thus enables selection of desired emission lines. In doing so, the prism with a thickness T corresponding to the height of its apex from its base appears to behave as a material of thickness 2T. By rotatably adjusting the prism about an axis 65 passing through its apex normal to the axis of the laser element 10 (and normal to the plane of the prism section shown), the apparent thickness of the prism 12' may be changed to attain adjustable selection of laser emission lines.

It will be apparent from the foregoing description of the invention that a laser structure embodying the invention enables the emissive line spectrum of the laser emitted light to be selectively controlled and rendered relatively independent of the pumping light intensity, particularly in that the laser emitted light energy has a frequency spectrum consisting essentially only of a series of equally spaced sharp lines. A laser structure embodying the invention has the further advantage that it may, if desired, be effectively tuned mechanically or electrically to center the laser light emissive lines upon particular frequencies within an overall spontaneous-emission frequency spectrum characteristic of the laser element employed in the structure and readily enables shifting of the positions of these emissive lines in the frequency spectrum as desired. Since as explained above the emissive line spectrum of the laser structure can be controlled by controlling either or both the index of refraction and the effective thickness of a reflective plate or equivalent structure positioned in the propagation path of the laser light, change of any condition (such as temperature, strain or position) which affects either of these two factors will change the effective resonant characteristic of the laser resonant structure and, accordingly, may be indicated by observation of the emission line spacing and variations of spacing.

While specific forms of the invention have been described for purposes of illustration, it is contemplated that numerous changes may be made without departing from the spirit of the invention.

We claim:

1. A laser structure comprising an elongated laser element of solid material, highly reflective means forming a laser-light energy termination at one end thereof, a highly polished laser-light energy transmitting surface formed on the other end of said laser element and disposed in normal relation to the longitudinal axis thereof so as to allow upon stimulated emission of radiation laser-light energy to exit as a beam therethrough, and a laser-light transmissive member disposed in axially spaced relation to said elongated laser element in the path of the laser-light energy exiting through said polished end, said member having a pair of partially reflective surfaces disposed thereon in materially spaced parallel relation to each other and in substantially normal relation to the axis of said laser element so as to receive said exiting laser-light energy and reflectively direct at least a part thereof back toward said laser element along a light energy traversal path through said member, said pair of partially reflective surfaces of said member each being in contact with a fluid medium having a known refractive index of a different value from that of said member so as to provide refractive index differences at the member-fluid medium interfaces thereof, the distance from said member through said laser element to said highly reflective means being many times greater than the length of the laser-light energy traversal path in said member between said pair of spaced partially reflective surfaces, and said laser-light energy traversal path length between said pair of spaced reflective surfaces being a very large number of times greater than the mean wavelength of said laser-light energy, and also being such as to provide an optical path length within said member substantially equal to an odd integral number of quarter wavelengths at the wavelength of at least one preselected frequency component of said laser light, said spaced pair of partially reflective surfaces cooperating with said member to constitute a partially reflective termination for laser-light energy passing beyond said polished end surface and providing relatively high reflectivity for energy at the wavelength of at least one of said preselected frequency components, thereby to form with said polished end and said highly reflective means a resonant cavity to substantially augment the stimulated emission of radiation emitted by said laser structure.

2. The structure defined in claim 1 and wherein adjustable means is provided for varying the effective optical path value between said pair of spaced partially reflective surfaces.

3. The structure defined in claim 1 and wherein said laser-light transmissive member is a solid platelike member having a predetermined refractive index value greater than unity.

4. The structure defined in claim 1 and wherein means is provided for adjustably tilting the plane of said member at an angle to said axis to vary the effective axial spacing of said pair of partially reflective surfaces.

5. The structure defined in claim 1 and wherein said member includes material which is responsive to an applied electrical field to vary the effective axial spacing of said pair of partially reflective surfaces in accordance with variations in the strength of an electrical field, and means for applying an electrical field to said material.

6. The structure defined in claim 1 and wherein said member is in the form of a laser-light transmissive plate of piezoelectric material and a pair of conductive electrodes in the plane of the plate are disposed at opposite sides of the plate for applying to the plate an electric potential field thereto for adjusting the axial spacing between said pair of partially reflective surfaces.

7. The structure defined in claim 1 and wherein said member includes material which exhibits birefringence in the presence of an electrical field applied thereto and effectively changes the separation of the reflective surfaces by an amount varying with field strength, and means for applying an electrical field to said material to adjust the axial spacing between said pair of partially reflective surfaces.

8. The structure defined in claim 1 and wherein said member is in the form of a laser-light transmissive Kerr cell providing said partially reflective surfaces and electrical means including electrodes spaced at opposite sides of the path of said light are provided to electrically energize said electrodes and adjust the effective axial spacing between said pair of partially reflective surfaces.

9. The structure defined in claim 1 and wherein said member is formed of a material which exhibits a Faraday effect in the presence of a magnetic field and effectively changes the wavelength separation between said pair of partially reflective surfaces, and means for adjustably applying a magnetic field to said material.

* * * * *